March 12, 1929.    J. C. MORRELL    1,705,199
PROCESS OF TREATING RESIDUAL OILS
Filed Oct. 22, 1923
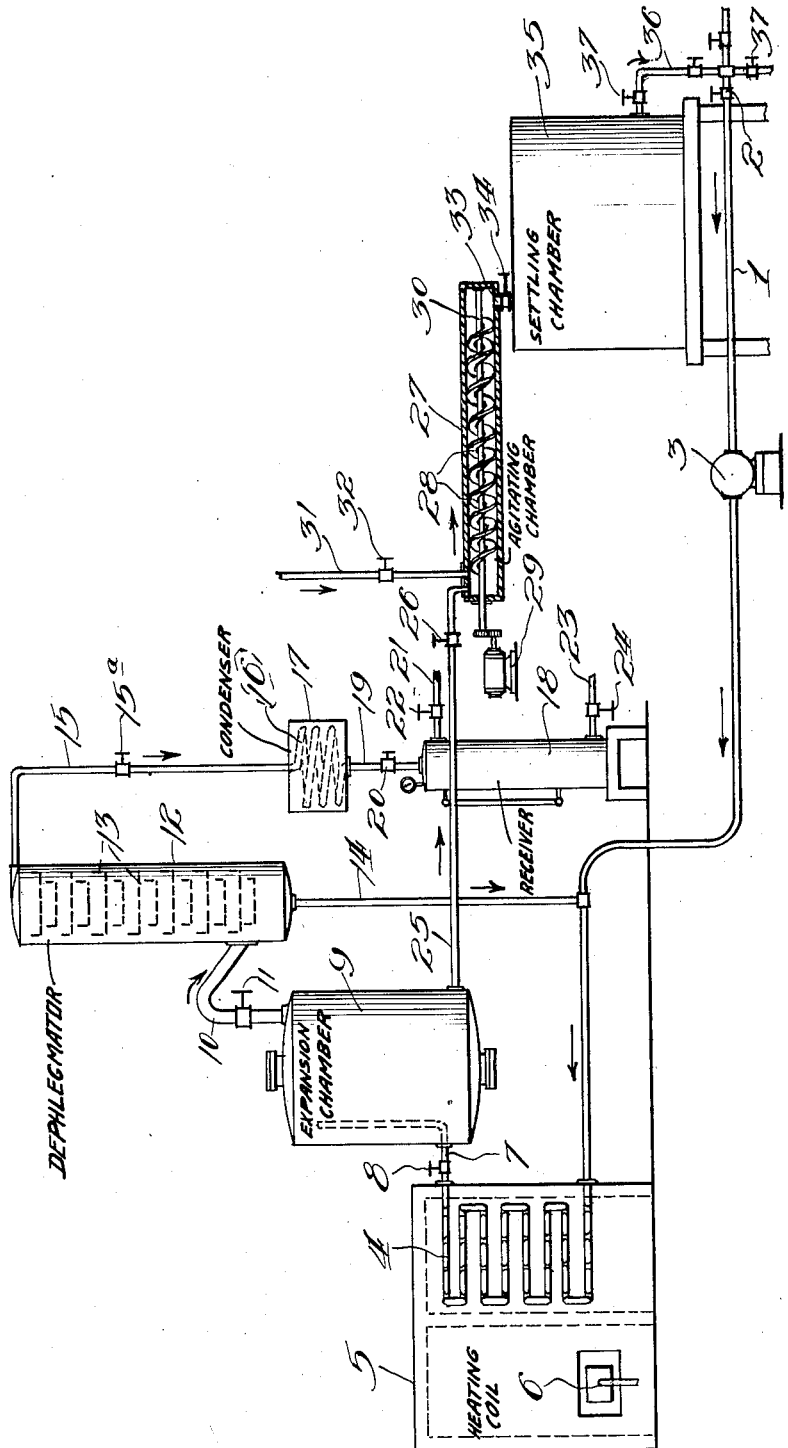
Witness:
Inventor:
Jacque C. Morrell
by Frank L. Belknap
Atty.

Patented Mar. 12, 1929.

1,705,199

UNITED STATES PATENT OFFICE.

JACQUE C. MORRELL, OF CHICAGO, ILLINOIS, ASSIGNOR TO UNIVERSAL OIL PRODUCTS COMPANY, OF CHICAGO, ILLINOIS, A CORPORATION OF SOUTH DAKOTA.

PROCESS OF TREATING RESIDUAL OILS.

Application filed October 22, 1923. Serial No. 669,894.

This invention relates to improvements in process of treating residual oils, and refers more particularly to the precipitation of pitch-like coke forming particles suspended and partially dissolved in cracked residuum by treatment with a coalescing agent such as sulphuric acid.

In attempting to use the residual oil obtained, as a by-product when cracking oils under heat and pressure, as fuel or part of the charging stock for retreatment, difficulty has been encountered in that the residuum contains a certain amount of suspended and partially dissolved pitch-like and coke forming particles. These particles will remain suspended for varying lengths of time, but they will eventually settle out, some in the run down and feed lines, etc., generally clogging up the system. These coke forming particles, upon analysis, show not only carbon, but must necessarily contain some hydrogen as upon heating, certain of these substantially solid particles assume a semi-solid consistency.

I have discovered that by adding a precipitating agent, such as sulphuric acid, to the residuum and subjecting the mixture to agitation, the coke forming particles contained in the residuum will coalesce with each other, combined with the sulphuric acid and precipitated from the oil. In some cases it may be desirable to heat the residuum before treatment, as this facilitates the removal of the precipitated material. Sulphuric acid of varying strengths, from 90% to over 100% fuming sulphuric acid, may be used. The sulphuric acid may react chemically and chemico-physically, the latter causing coalescence of the suspended material.

The amount of sulphuric acid used in proportion to the residuum treated, may vary, which can be determined in each case by preliminary test, but I have found that a mixture of 100 parts residuum containing 12% coke-forming particles, to 4 parts coalescing agent, resulted in all of the acid being taken up by the suspended pitch-like particles to form a homogeneous mass with the precipitated material. The precipitated material containing the sulphuric acid derivatives is useful in the arts for the various purposes for which asphalt for instance, is used.

The acid sludge resulting from the purifying treatment of light or lubricating oils, and heretofore thrown away, may be utilized instead of, or combined with fresh precipitating agents. It will be readily seen that this results in a minimum of treating loss.

Summing up, three novel and useful purposes are accomplished: 1 The precipitation of undesirable suspended materials in residuum which interfere with their use as fuel and for other purposes. 2. The utilization of the precipitated material in the arts. 3. The use of an acid sludge from a former treatment, as the precipitating agent.

It may be advisable to treat mixtures of cracked residuum and other oils, preferably lighter in gravity. As a specific illustration of my invention, I have used a cracked residuum of 15.5 Baumé gravity, containing 12% insoluble material in a mixture of 50% gasoline and the original material, and 5% insoluble in a mixture of 50% benzol and the original material, the following was obtained: 86% of the original volume of oil was recovered by settling after agitation with 66° Baumé gravity sulphuric acid. The recovered oil had a Baumé gravity of 21, and could now be used as a charging stock for the cracking system. The remaining material was a homogeneous pitch-like mass resembling asphalt, useful as indicated above.

Any small amount of free acid in the homogenous mass can be neutralized and made part of the mass by the addition of slaked or unslaked lime.

In the accompanying drawing, I have shown one way of carrying out my process, in which the single figure is a diagrammatic side elevational view, partly in section.

Referring to the drawing, 1 designates the charging line provided with valve 2 and pump 3 leading to the heating coils 4, seated in the furnace 5, heated by the burner 6. The heated oil passes by means of the transfer line 7, controlled by valve 8 to the vertical expansion chamber 9, where vaporization takes place. The vapors pass through the outlet 10 controlled by valve 11 to the lower portion of dephlegmator 12, provided with the usual baffles 13, reflux condensate drawoff 14 and vapor outlet 15, controlled by valve 15$^a$ leading to condenser coil 16, in condenser box 17. The condensed vapors pass into receiver 18 through the connection 19 controlled by valve 20. The receiver is equipped with the usual pressure gauge, liquid level gauge, etc., (not shown), and with pressure relief pipe 21, controlled by valve 22, liquid drawoff 23, controlled by valve 24. The oil may be heated in the heating coil 4 to a temperature of say 800 to 950° F. sufficient to allow vaporization of a substantial portion in the expansion chamber 9. A pressure of say, 135 pounds may be maintained on the entire system, or differential pressures may be maintained on the various stages by manipulation of the valves.

Referring now to the feature of the invention, the residuum may be drawn off from expansion chamber 9 through residue drawoff 25, which has interposed therein valve 26 for reducing the pressure, if necessary. The other end of pipe 25 is connected to the agitating chamber 27, in which is positioned the screw conveyor 28 driven by the motor 29, which rotates the shaft 30. I have shown a horizontal chamber and conveyor. It is obvious that I may use a vertical chamber and conveyor, and in addition, any well known mechanical means such as a series of paddles or fins attached to the shaft 30 for agitating. A lighter gravity oil may be introduced between the residue drawoff and inlet to the chamber 27, if desirable.

The precipitating agent, in this instance, sulphuric acid, may be forced into the interior of the chamber 27 through the inlet pipe 31 controlled by valve 32 in any quantity. The acid and hot residuum are thoroughly mixed in the chamber 27 and drawn off through the outlet 33 controlled by valve 34 into a settling chamber 35. After being allowed to settle, the treated residuum may be withdrawn through the line 36, controlled by valves 37 to storage, or may be returned to the charging line 1, for retreatment. The precipitated material settling in the chamber 35 will be in a homogeneous mass suitable for the purposes above described.

By this apparatus, it is possible to withdraw and treat the hot residuum, and then withdraw the treated residuum as above described, as part of a continuous operation.

It is understood that the process is not limited to use with this particular apparatus, but may be carried out as the judgment of a skilled man would dictate.

I claim as my invention:

1. A process for treating residual oils resulting from the cracking of petroleum oil under heat and pressure, consisting in withdrawing such residual oil from a reaction zone of a cracking process while in a highly heated condition and in introducing to such highly heated residual oil sulphuric acid to act as a precipitating agent, in agitating the highly heated residual oil in the presence of the precipitating agent to cause the pitch-like and coke forming particles in the residual oil to coalesce and be precipitated therefrom, the precipitating agent being taken up by the pitch-like and coke forming particles to form a substantially solid mass.

2. A process for treating residual oils resulting from the cracking of petroleum oil under heat and pressure, consisting in withdrawing the highly heated residual oil from the conversion zone of an oil cracking process, in reducing the pressure on said residual oil, in introducing into such residual oil sulphuric acid, in agitating the highly heated residual oil in the presence of such sulphuric acid, in transferring the agitated oil and acid into a quiescent zone wherein the pitch-like and coke forming particles coalesce and are precipitated, the sulphuric acid being taken up by the coke forming particles to form therewith a homogeneous pitch-like mass.

3. A process for treating residual oils resulting from the cracking of petroleum oil under heat and pressure, consisting in withdrawing the highly heated residual oil from a conversion zone of an oil cracking process and in introducing to such highly heated residual oil an acid sludge from a former treatment to act as a precipitating agent, in agitating said highly heated residual oil and acid sludge, in transferring the mixed residual oil and acid sludge to a settling zone wherein the pitch-like coke forming particles of the residual oil coalesce and are precipitated together with the acid and form therewith a homogeneous pitch-like mass.

4. A process for treating hydrocarbon oils, consisting in withdrawing from a conversion zone of an oil cracking process highly heated residual oil, in agitating such highly heated residual oil in the presence of an acid precipitating agent, in transferring the mixed residual oil and acid precipitating agent to a settling zone wherein the pitch-like carbon forming particles of the residual oil and the acid coalesce and precipitate to form a homogeneous pitch-like mass and from which settling zone the residual oil freed of the pitch-like coke forming particles is returned to the oil cracking process for further treatment.

5. A process for treating hydrocarbon oils comprising withdrawing from a conversion zone of an oil cracking process highly heated residual oil, agitating such residual oil in the presence of an acid precipitating agent, transferring the mixed residual oil and acid precipitating agent to a settling zone wherein the pitch-like carbon forming particles of the residual oil and the acid coalesce and precipitate, forming a homogeneous pitch-like mass.

JACQUE C. MORRELL.